United States Patent Office 3,342,305
Patented Sept. 19, 1967

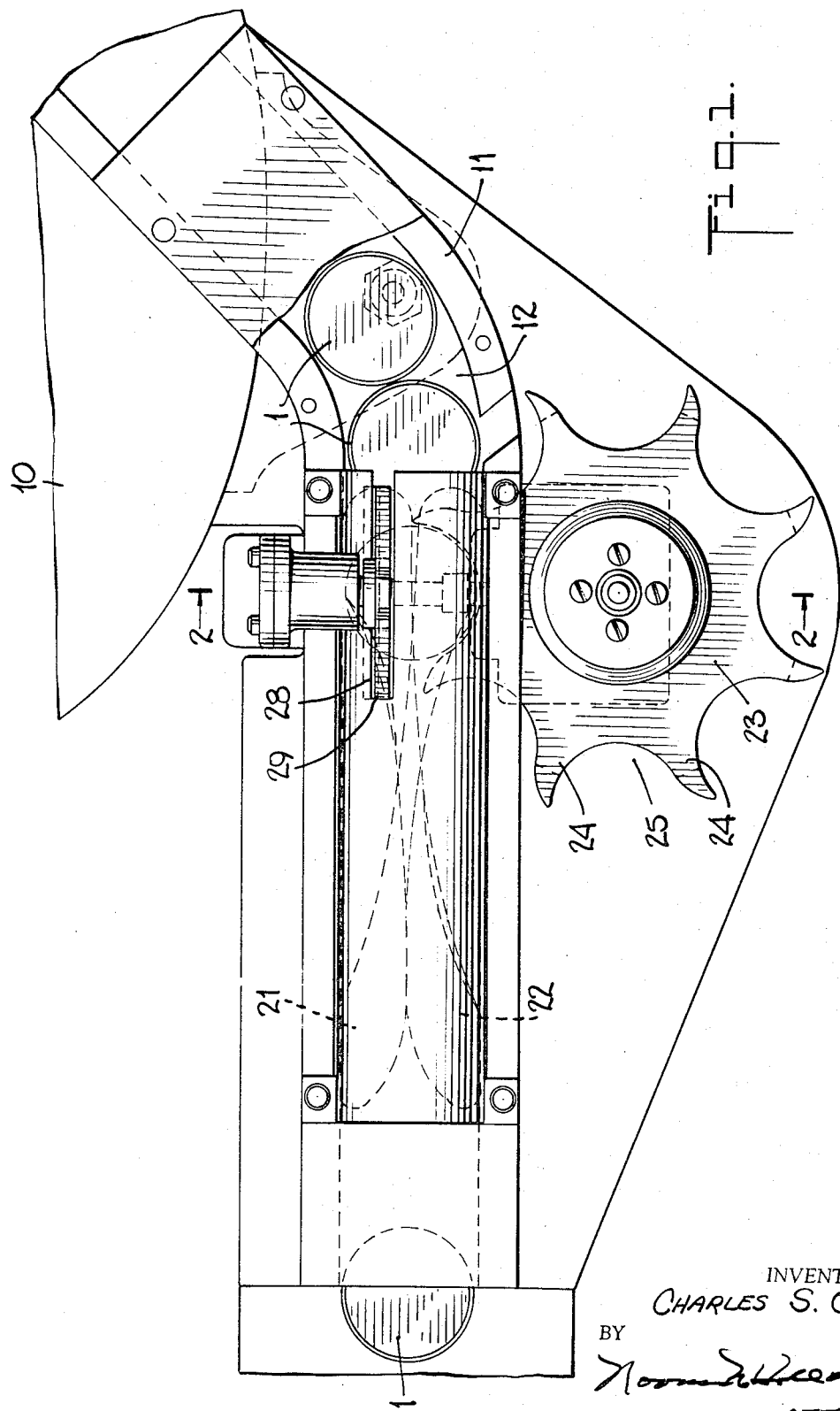

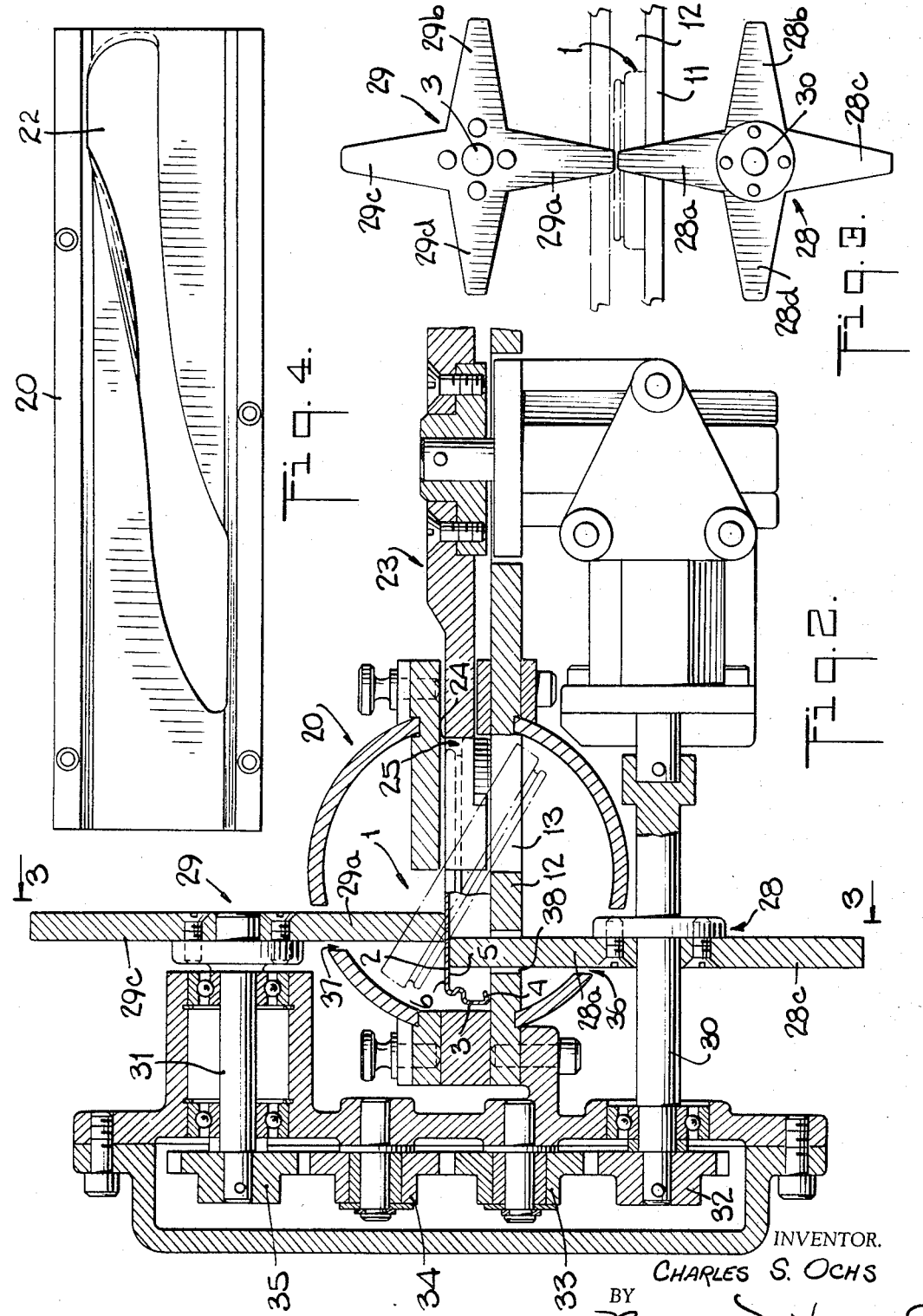

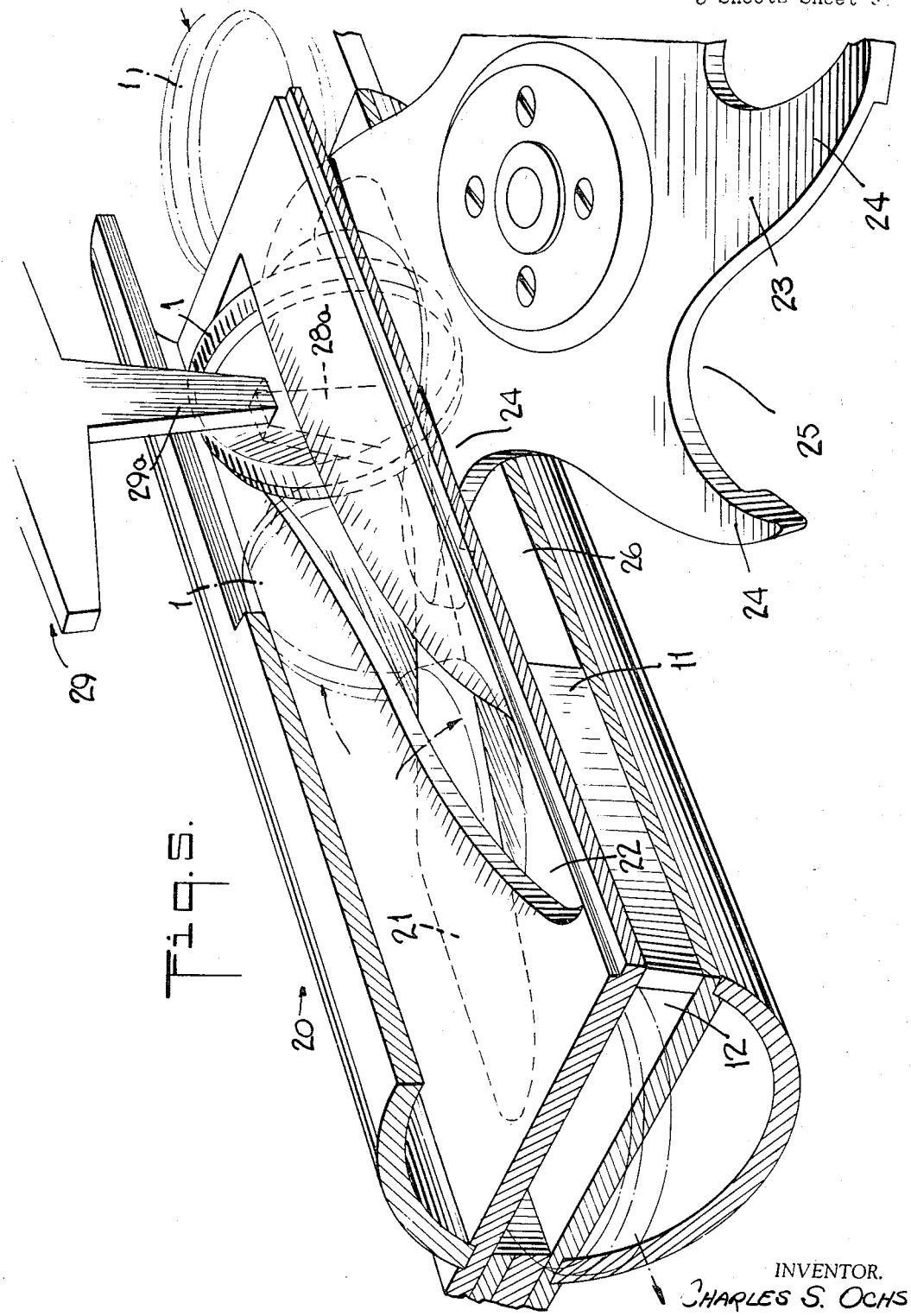

3,342,305
ALIGNING MECHANISM
Charles S. Ochs, Lancaster, Ohio, assignor to Anchor Hocking Glass Corporation, Lancaster, Ohio, a corporation of Delaware
Filed Jan. 12, 1966, Ser. No. 534,263
18 Claims. (Cl. 198—33)

ABSTRACT OF THE DISCLOSURE

The present invention is directed to a mechanism for inverting improperly positioned closure caps which comprises a pair of rotatable pinwheels mounted above each other and offset with respect to each other. Each of said pinwheels has fingers which operate in synchronism with each other. Means, such as a star wheel, is provided for moving closure caps between said fingers so that properly positioned closure caps will pass between the finger and be prevented from being tilted by said fingers. Said fingers are adapted to tilt improperly positioned closure caps around an axis parallel to the path of movement of the pinwheels. Inverting means (such as inverting cams mounted in an inverting tunnel) are provided adjacent said fingers which are adapted to act on said tilted closure caps to invert them.

---

The present invention relates to a cap feeding and cap aligning machanism adapted to be used in connection with an automatic container sealing machine or any other mechanism in which closure caps are arranged in a uniform manner. More particularly, the present invention relates to an inverting mechanism to invert improperly positioned closure caps and place them in proper position.

In order to apply a closure cap to a container to form a sealed package, the closure caps are fed from a suitable source, such as a hopper, and are supplied to a sealing machine which applies the closure caps to the containers to form a package.

The closure caps are applied over the mouths of the containers and are either screwed or twisted on to the container or are pressed thereon to form a package.

In such sealing machines it is important that the closure caps be presented to the sealing mechanism in proper position, i.e. with their cover portions facing upwardly so that they may be placed directly over the container mouth. If a closure cap is presented to a container in an inverted position, i.e. with the cover portion facing downwardly, the cap will not be able to be applied to a container finish and, unless detected, may cause damage to the container or may jam up the sealing operation.

Hence it is desirable that all the closure caps be positioned in their proper position, i.e. with their cover portions facing upwardly, before they are presented to the sealing mechanism of the sealing machine in order to permit the closure caps to be applied directly to the container.

The closure caps are usually stored in hoppers and are fed by a chute to the sealing mechanism in one-by-one relationship. Some of the closure caps are fed from the hopper in proper position, i.e. with their cover portions facing upwardly. If this occurs the caps are fed directly to the sealing mechanism. However if a closure cap is fed from the hopper when not in proper position, i.e. with its cover portion facing downwardly, then the improperly positioned cap will have to be inverted by a suitable inverting mechanism to place the cap in its proper position before allowing it to be delivered to the sealing machine.

A number of such inverting mechanisms have been developed and used for a number of years. However many of such devices are complex and require a number of moving parts. Other detecting devices merely return the improperly positioned closure caps back to the hopper. This is objectionable because the continuity of the sealing operation is interrupted with a consequent loss of time. A number of other inverting devices presently in use do not operate with the speed necessary for present production schedules.

The present invention has for one of its objects an improved cap aligning mechanism which will automatically invert improperly positioned closure caps and place them in the proper position.

Another object of the present invention is the provision of an improved inverting mechanism which will invert improperly positioned closure caps without interruption and at increased speeds.

Another object of the present invention is to provide an improved inverting mechanism which is simple to operate and maintain and which is inexpensive to construct.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a plan view of the inverting mechanism of the present invention;

FIG. 2 is a sectional view taking along line 2—2 of FIG. 1;

FIG. 3 is a detail showing the means for determining whether or not a closure cap is properly positioned;

FIG. 4 is a plan view of one of the inverting cams used in connection with the present invention; and FIG. 5 is a perspective view showing the inverting mechanism of the present invention in operation.

Referring to the drawing, a closure cap 1 which is to be delivered to a sealing machine (not shown) comprises a cover portion 2 and a skirt portion 3. The skirt portion 3 may be provided with the usual locking lugs 4, or some other suitable locking means, for permitting the closure cap 1 to be applied to a container (not shown) by a sealing machine (not shown). The cover portion 2 has an inner surface 5 and an outer surface 6. Such closure caps 1 are also provided with sealing means, such as sealing gaskets or the like, which, for purposes of clarity, have not been shown in the drawings.

The closure caps 1 (FIG. 1) are fed in one-by-one fashion from a hopper 10 and delivered to a sealing machine (not shown) by means of a chute 11. The chute 11 may be of any general configuration and is usually provided with a guideway 12 along which the closure caps 1 travel.

The closure caps 1 are delivered to the chute 11 either properly positioned (as shown in full lines in FIG. 2) in which the cover portion 2 faces upwardly, or improperly positioned (as shown in broken lines in FIG. 2) in which the cover portions 2 face downwardly.

On their way to the sealing machine, the closure caps 1 pass through an inverting tunnel 20 mounted around the chute 11 which is adapted to invert improperly positioned closure caps. The inverting tunnel includes a pair of inverting cams 21 and 22 which are specially shaped and positioned so as to act on and invert improperly positioned closure caps and place them in proper position.

The chute 12 (FIG. 2) has a partially open bottom 13 which permits improperly positioned caps 1 to tilt and be brought under the influence of inverting cams 21 and 22.

A star wheel 23 having spaced arms 24 to form pockets 25 is located adjacent the inverting tunnel 20 and is rotated in a plane substantially parallel to the guideway 12 with power from the closure caps 1 coming from the hopper 10. The arms 24 enter the inverting tunnel 20 through opening 26 (FIG. 5) therein and sweep the guideway 12 to place closure caps 1 in pockets 25 and to thereby center the closure caps 1 relative to a pair of detecting pinwheels 28 and 29.

The detecting pinwheels 28 and 29 are both rotated by drive 27 in synchronism with star wheel 23 through shafts 30 and 31 and gear mechanism 32, 33, 34 and 35 (FIG. 2). The plane of rotation of the detecting pinwheels 28 and 29 is substantially perpendicular to the chute 12. The pinwheels 28 and 29 have a plurality of fingers, 28a, 28b, 28c, 28d and 29a, 29b, 29c, 29d, respectively. The detecting pinwheels 28 and 29 are driven in synchronism with each other and with the star wheel 23 so that the finger 28a of the lower pinwheel 28 is in its uppermost position, as shown in FIG. 3. In this position the star wheel 23, operating in synchronism with pinwheels 28 and 29, properly locates the closure cap 1 between the fingers 28a and 29a. The pinwheels 28 and 29 rotate along planes substantially perpendicular to the chute 12 and, as shown in FIG. 2, the pinwheels 28 and 29 overlap each other slightly.

The fingers of the pinwheels 28 and 29 extend into the inverting tunnel 20 through slots 36 and 37, respectively, and the fingers of the lower pinwheel 28 extends into the chute 12 through slot 38 therein. The pinwheels 28 and 29 are so positioned relative to each other that, within the tunnel 20, planes tangent to the circular paths described by the ends of the fingers are only slightly spaced from each other. In other words, when the fingers 28a and 29a are in the positions shown in FIGS. 2 and 3, the ends of the fingers 28a and 29a are on planes which are spaced from each other a slight distance. In the particular embodiment shown in the drawings, this distance is approximately equal to the thickness of the cover portion 2. Hence in the position of the fingers 28a and 29a shown in FIGS. 2 and 3, the finger 28a is almost in contact with the inner surface 5 of the cover portion 2 and the finger 29a is almost in contact with the outer surface 6 of the cover portion 2. It will be understood this spacing of the fingers 28a and 29a may vary without departing from the present invention.

With this structure each closure cap 1 is moved through the inverting tunnel 20 and as it enters therein the pockets 25 of the star wheel 23 positions each cap between the pinwheels 28 and 29. If a properly positioned closure cap (as shown in full lines in FIG. 2) is delivered to the inverting tunnel 20, the lowermost finger 29a of the upper pinwheel 29 passes over the outer surface 6 of the cover portion 2 thereof in close adjacency thereto and the uppermost finger 28a of the lower pinwheel 28 passes within the inner space of the closure cap 1 and beneath the inner surface 5 of the cover portion 2 in close adjacency thereto. The closure cap 1 is therefore not affected by the fingers of the pinwheels 28 and 29 and will be moved to the sealing machine. However the fingers of pinwheels 28 and 29 will prevent properly positioned closure caps from being tilted by the force of gravity.

However if the closure cap 1 is improperly positioned, i.e. with its cover portion facing downwardly (as shown in broken lines in FIG. 2), the finger 28a of the lower pinwheel 28 strikes the outer surface 6 of the cover portion 2 and raises the closure cap to tilt the closure cap, as shown in dotted lines in FIG. 2 and FIG. 5. When it is tilted the closure cap 1 will be brought under the influence of cam surfaces 21 and 22 which act on the tilted closure cap so as to invert it to its proper position as the closure cap is moved through the inverting tunnel 20.

It will thus be seen that the present invention provides an improved inverting mechanism which eliminates the use of a mechanism for returning the caps to the hopper and which will invert improperly positioned closure caps at a faster speed compatible with present high speed sealing machines. It will further be seen that the present invention is capable of being used with non-magnetic as well as magnetic closure caps.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An inverting mechanism for inverting improperly positioned closure caps comprising a pair of pinwheels rotatable about parallel axes, each of said pinwheels having fingers which operate in synchronism with each other, said pinwheels being spaced above each other, means for moving closure caps between said fingers whereby properly positioned closure caps will be prevented from being tilted by said fingers, said fingers being adapted to tilt improperly positioned closure caps, and inverting means adjacent said fingers adapted to act on said tilted closure caps to invert them, wherein a star wheel is positioned adjacent said pinwheels and is rotatable in a plane substantially perpendicular to the plane of rotation of said pinwheels, said star wheel having pockets therein adapted to receive and position closure caps between said pinwheels.

2. An inverting mechanism as claimed in claim 1, wherein said pinwheels and said star wheel are rotatable in synchronism with each other.

3. An inverting mechanism as claimed in claim 1, wherein the planes of said pinwheels are offset from each other.

4. An inverting mechanism for inverting improperly positioned closure caps comprising a pair of pinwheels rotatable about parallel axes, each of said pinwheels having fingers which operate in synchronism with each other, said pinwheels being spaced above each other, means for moving closure caps between said fingers whereby properly positioned closure caps will be prevented from being tilted by said fingers, said fingers being adapted to tilt improperly positioned closure caps, and inverting means adjacent said fingers adapted to act on said tilted closure caps to invert them, wherein the planes of said pinwheels are offset from each other.

5. An inverting mechanism as claimed in claim 4, wherein said inverting means comprises cams adapted to act on said tilted closure caps.

6. An inverting mechanism as claimed in claim 4, wherein said inverting cams are positioned within an inverting tunnel in the path of said closure caps.

7. An inverting mechanism as claimed in claim 4, wherein said pinwheels are adapted to rotate in planes substantially perpendicular to the path of travel of said closure caps.

8. An inverting mechanism as claimed in claim 4, wherein the fingers of the pinwheels are moved in paths tangent to planes which are spaced from each other at the point of closest approach between the fingers.

9. An inverting mechanism as claimed in claim 8, wherein the space between the planes are substantially equal to the thickness of the cover portion of a closure cap passing between the fingers.

10. An inverting mechanism as claimed in claim 4, wherein said inverting means comprises cams adapted to act on said tilted closure caps.

11. An inverting mechanism as claimed in claim 4, wherein said inverting cams are positioned within an inverting tunnel in the path of said closure caps.

12. An inverting mechanism as claimed in claim 4, wherein a star wheel is positioned adjacent said pinwheels and is rotatable in a plane substantially perpendicular to the plane of rotation of said pinwheels, said star wheels having pockets therein adapted to receive and position closure caps between said pinwheels.

13. An inverting mechanism as claimed in claim 12, wherein said pinwheels and said star wheel are rotatable in synchronism with each other.

14. An inverting mechanism as claimed in claim 4, wherein said pinwheels are adapted to rotate in planes substantially perpendicular to the path of travel of said closure caps.

15. An inverting mechanism as claimed in claim 4, wherein the planes of said pinwheels are offset from each other.

16. An inverting mechanism as claimed in claim 4, wherein the fingers of the pinwheels are moved in paths tangent to planes which are spaced from each other at the point of closest approach between the fingers.

17. An inverting mechanism as claimed in claim 16, wherein the space between the planes are substantially equal to the thickness of the cover portion of a closure cap passing between the fingers.

18. A mechanism for inverting improperly positioned closure caps comprising a pair of rotatable pinwheels, offset and having parallel axes, each of said pinwheels having fingers which operate in synchronism with each other, means for moving closure caps between said fingers whereby properly positioned closure caps will be prevented from being tilted by said fingers, said fingers being adapted to tilt improperly positioned closure caps around an axis parallel to the path of movement of said closure caps, and inverting means adjacent said fingers adapted to act on said tilted closure caps to invert them.

References Cited

UNITED STATES PATENTS

| 2,270,713 | 1/1942 | Belada | 193—43 |
| 3,195,705 | 7/1965 | Ochs | 193—43 |
| 3,261,442 | 7/1966 | Beck | 193—43 |

FOREIGN PATENTS 453,052   11/1927   Germany.

ANDRES H. NIELSEN, *Primary Examiner.*

EDWARD A. SROKA, *Examiner.*